United States Patent
Li et al.

(10) Patent No.: US 11,037,184 B2
(45) Date of Patent: Jun. 15, 2021

(54) LEVERAGING SHOPPERS FOR STORE PICK UP

(71) Applicant: International Business Machines Corporation, Armonk, NY (US)

(72) Inventors: Jialin Li, Westford, MA (US); Pradeep K. Nanjundaswamy, Bangalore (IN); Srikanth Sundararajan, Cambridge, MA (US); Danai Tengtrakool, Burlington, MA (US)

(73) Assignee: International Business Machines Corporation, Armonk, NY (US)

( * ) Notice: Subject to any disclaimer, the term of this patent is extended or adjusted under 35 U.S.C. 154(b) by 171 days.

(21) Appl. No.: 15/432,371

(22) Filed: Feb. 14, 2017

(65) Prior Publication Data
US 2018/0232755 A1 Aug. 16, 2018

(51) Int. Cl.
*G06Q 30/00* (2012.01)
*G06Q 10/00* (2012.01)
*G06Q 30/02* (2012.01)
*G06Q 10/08* (2012.01)

(52) U.S. Cl.
CPC ....... *G06Q 30/0222* (2013.01); *G06Q 10/087* (2013.01); *G06Q 30/0239* (2013.01); *G06Q 30/0238* (2013.01)

(58) Field of Classification Search
None
See application file for complete search history.

(56) References Cited

U.S. PATENT DOCUMENTS

| 7,107,228 | B1 | 9/2006 | Walker et al. |
| 8,768,763 | B2 * | 7/2014 | Horvitz ................. G06Q 30/06 705/14.23 |
| 9,129,242 | B2 * | 9/2015 | Wheeler .......... G06Q 10/06311 |
| 9,342,806 | B2 * | 5/2016 | Urban ............ G06Q 10/063114 |
| 2002/0077927 | A1 | 6/2002 | Lasnier et al. |
| 2003/0033183 | A1 * | 2/2003 | Kawashima ... G06Q 10/063114 705/7.15 |

(Continued)

OTHER PUBLICATIONS

Barter, Dec. 12, 2015, Wikipedia, printed through www.archive.org (Year: 2015).*

(Continued)

*Primary Examiner* — Naresh Vig
(74) *Attorney, Agent, or Firm* — Scully, Scott, Murphy & Presser, P.C.; Stephanie Carusillo, Esq.

(57) ABSTRACT

A method, system and computer program product are disclosed for using shoppers for in-venue pick up of online orders. In an embodiment, the method comprises determining that an online order has been placed by a first shopper for a product in a venue, identifying a second shopper in a specified area to get the product, sending to the second shopper a message including a promotional offer in exchange for getting the product, receiving the product from the second shopper, and in response to receiving the product from the second shopper, honoring the promotional offer. In an embodiment, the second shopper is identified in a specified area relative to the venue. In an embodiment, the method further comprises determining a cost associated with getting the product in the store; and generating the promotional offer based, at least in part, on this determined cost associated with getting the product.

20 Claims, 5 Drawing Sheets

(56) References Cited

U.S. PATENT DOCUMENTS

| | | | | |
|---|---|---|---|---|
| 2014/0244329 | A1* | 8/2014 | Urban | G06Q 10/063114 |
| | | | | 705/7.15 |
| 2014/0279238 | A1 | 9/2014 | Jones et al. | |
| 2014/0279294 | A1* | 9/2014 | Field-Darragh | G06Q 10/087 |
| | | | | 705/28 |
| 2015/0100433 | A1 | 4/2015 | Choy et al. | |
| 2015/0310536 | A1* | 10/2015 | Brady | G06Q 30/0635 |
| | | | | 705/26.5 |
| 2016/0012488 | A1 | 1/2016 | Deshpande et al. | |
| 2016/0098782 | A1 | 4/2016 | Bleakley et al. | |
| 2016/0148300 | A1 | 5/2016 | Carr et al. | |
| 2017/0109777 | A1* | 4/2017 | Lee | G06Q 30/0238 |
| 2017/0236177 | A1* | 8/2017 | Sebastian | G06Q 30/0617 |
| | | | | 705/14.11 |
| 2017/0337531 | A1* | 11/2017 | Kohli | G06Q 20/102 |
| 2018/0134492 | A1* | 5/2018 | Lert, Jr. | G05B 19/41815 |

OTHER PUBLICATIONS

Mike Dean, How to Become an UberEats Food Delivery Driver, Dec. 17, 2016, Rideshare Reports (Year: 2016).*
Charles T. Horngren et al., Accounting, 2005, Pearson Prentice Hall, Sixth Edition, pp. 757-760 (Year: 2005).*
Sebastian et al., U.S. Appl. No. 62/296,417, filed Feb. 17, 2016 (Year: 2016).*
Chris Hagerty, FanFood Offers a Concession App for Sports Fans, Dec. 2, 2016, SiliconPrairyNews (Year: 2016).*
Poly Brewster, Need a Beer? These Ballpark Apps Are Changing How You Get One, www.entrlepreneur.com (Year: 2016).*
How Far Will You Send A Driver for Delivery, Nov. 16, 2016 (Year: 2016).*
Yao et al., Online Retailers, Shipping Fees, and the Bottom Line, May 2012, PwC network (Year: 2012).*
Kelsey Lindsey, 9 experts on the state of buy online pick up in-store, Jun. 13, 2016, RetailDive (Year: 2016).*
Information on Instacart, 2017, instacart.com, archived web pages printed through www.archive.org (Year: 2017).*
Lora Kolodny, Instacart's app has changed grocery stores for good, Aug. 31, 2016, techcrunch.com (Year: 2016).*
Ashlee Kieler, Instacart shoppers say customers confused by change to tipping policy, Nov. 2, 2016, ConsumerReports.com (Year: 2016).*
Sarah Perez, Contractors are preparing to boycott instacart over elimination tips, Sep. 9, 2016, techcrunch.com (Year: 2016).*
What is the difference between Associate and other titles, Feb. 2017, The Workplace (Year: 2017).*
Workforce on Demand Are you ready?, Disselkamp et al., Feb. 28, 2015, Deloitte (Year: 2015).*
Houseman et al., The Role of Temporary Agency Employment in Tight Labor Markets, 2003, Sage Publications, Inc., ILR Review, vol. 57, No. 1 (Oct. 2003), pp. 105-127 (Year: 2003).*
"SmartCenters to Open 'Pengiun Pick-Up' for Online Purchases", Internet Wire, Sep. 11, 2014, COMTEX News Network, Inc., Canada; ISSN: N/A; Database: Gale Group Computer Database.
Anonymous, "An electronic commerce process of tentative goods purchase, picking-up, and reselling if needed based on time-limit express delivery to physical store", IP.com Prior Art Database Technical Disclosure; IP.com No. IPCOM000237862D, Jul. 17, 2014.

* cited by examiner

LEVERAGING SHOPPERS FOR STORE PICK UP

BACKGROUND

This invention generally relates to e-shopping, and more specifically, to online purchases with in-store pick ups. Embodiments of the invention relate to leveraging in-store shoppers as resources to retrieve items for an online shopping order.

Physical stores are the differentiator for retailers to compete with online only retailers. A number of experiences are very important for the cross-channel commerce experience. These experiences include: buy online pick up in-store (pick up from store, or ship to store); buy online, return in-store; and buy online, ship from store (same as typical e-commerce experience). Various order management systems (OMS) are used for multi-channel order capture and processing, especially for the scenarios mentioned above.

One type of e-shopping that has become common is referred to as buy online pick up in store (BOPIS). In this type of shopping, a person places an order online, and the order is received at a particular store. The item or items of the order are collected at that store, and the online shopper can go to the store to get the ordered items, or the ordered items are shipped to that shopper. The order from the online shopper can be sent directly to a particular store, or the order may be sent to that store from a distributed order management system.

At the store, a store clerk may collect the ordered items and prepare these items for pick up by, or shipment to, the online shopper. Usually, the store is able to fill the order from its current inventory. If not all the items are available in the store's current inventory, the store can obtain the missing items from its suppliers or from other stores.

However, the physical store traffic is often volatile, and online traffic may be even more volatile. Normally, retailers configure the store capacity (people capacity can handle online orders), however, when the physical store is very busy, the orders for pick up or ship to customers may fail the promises made to the shoppers during order capture, e.g., two hours for pick up in a nearby store. So, typically retailers are conservative and commit to less transactions or inventory availability for online orders. Or, retailers set up a separate team for store pick ups for online orders. With this approach, if there are not enough orders from online shoppers, the team of store associates is just waiting for work.

For a big shopping day, like Black Friday, retailers do two things: hire temporary labor/contractors for store pick up/service; and commit less capacity for online orders even when there is enough inventory in the physical store, and it is better to get the shopper to pick up an order in the physical store for cross-selling and up-selling purposes.

SUMMARY

Embodiments of the invention provide a method, system and computer program product for using shoppers for in venue pick up of online orders. In an embodiment, the method comprises determining that an online order has been placed by a first shopper for a product in a venue; identifying a second shopper in a specified area and based on defined criteria to get the product; sending to the second shopper a message including a promotional offer in exchange for getting the product in the venue; receiving the product from the second shopper; and in response to receiving the product from the second shopper, honoring the promotional offer.

In an embodiment, the identifying a second shopper includes identifying the second shopper in a specified area relative to the venue. In an embodiment, the method further comprises determining a cost associated with getting the product in the store; and generating the promotional offer based, at least in part, on the determined cost associated with getting the product in the store.

Embodiments of the invention leverage the shopper in the physical store, who might be willing to help pick up some goods for the retailers, meanwhile earning some rewards like coupons or promotions. With knowledge of the presence of the in-store shopper, a merchant can do precision marketing to identify an in-store shopper to collect the items of an online purchase order. The use of the in store shopper reduces the pick up cost and enables the merchant to better meet the service level agreements (SLA) when the store staff is busy. In addition, the offer of coupons or promotions may stimulate the shopper in the physical store to make purchases.

Embodiments of the invention can trigger the use of the in-store shopper based on store associate availability and knowledge of the presence of the in-store shopper.

An embodiment of the invention provides a method of reducing overhead on online purchases with in-store pick up. The method comprises determining that an online order has been placed for a product in a venue by a first customer, and the product is to be received by the first customer at the venue. A second customer, who is in or near the venue, is identified and a notification of a promotional offer is sent to this second customer in exchange for retrieving the product from a location in the venue. The promotional offer is honored in response to receipt of the product from the second customer. The method also determines one or both of: that the second customer is within a threshold distance to the location of the product in the venue; and that the second customer has a required level of knowledge of one or both of the product and the location of the product.

The cost associated with an employee of the venue retrieving the product is determined, and the promotional offer is based, at least partly, on this cost. If the second customer is unwilling or unable to retrieve the product, the promotional offer can be increased in value equivalent to the cost associated with an employee of the venue retrieving the product, at most. Also, the promotional offer may encourage more purchases by the second customer.

DETAILED DESCRIPTION

Figure 1:
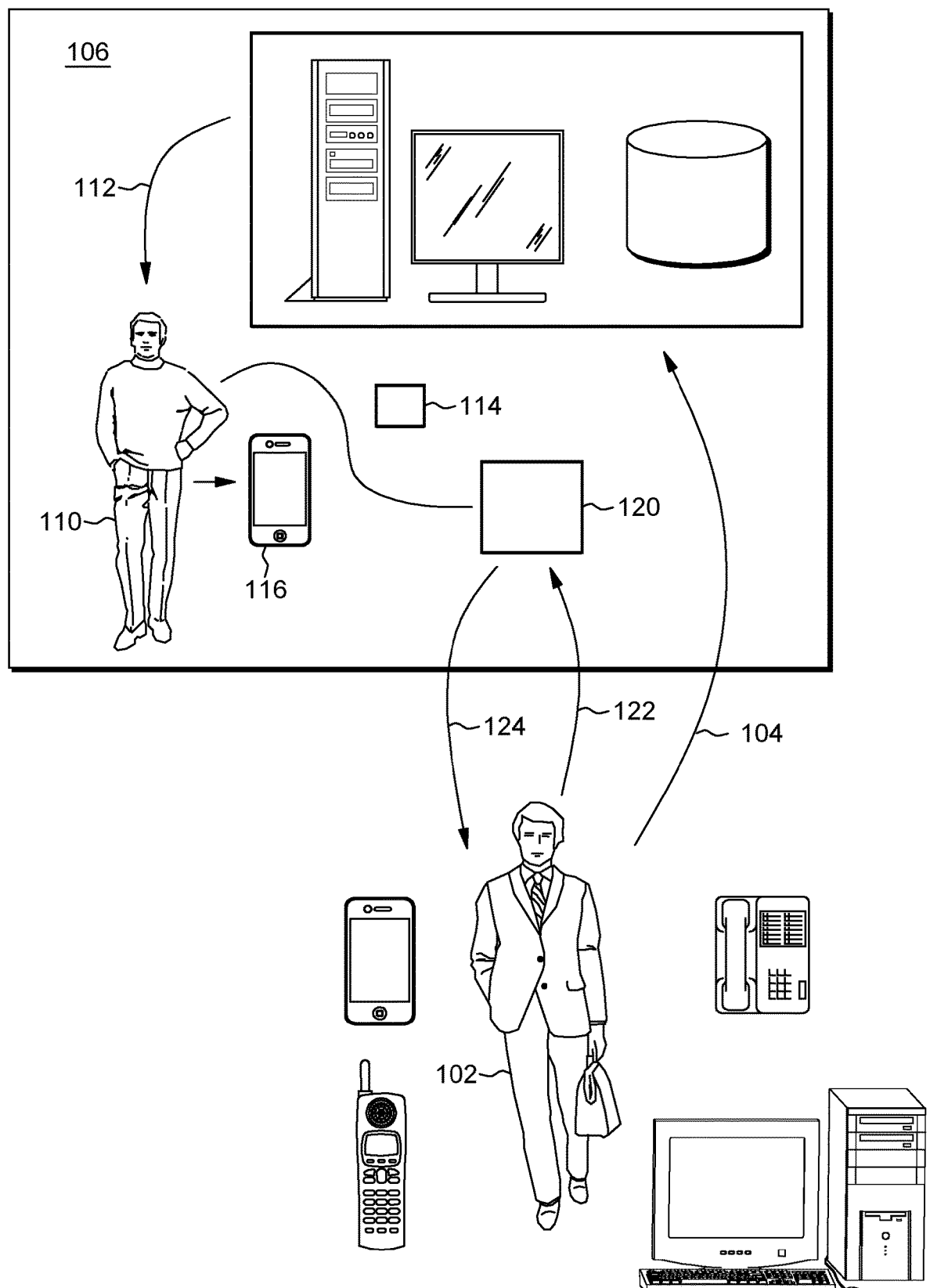
FIG. 1 illustrates a method and system in accordance with an embodiment of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention relate to e-shopping, and more specifically to online purchases with in store pick ups. Embodiments of the invention leverage in store shoppers as resources to do the picking for in store pick ups of online orders.

As discussed above, one type of shopping that has become common is referred to as buy online pickup in-store (BOPIS). In this type of shopping, a person places an order online, and the order is received at a particular store. The item or items of the order are collected at that store, and the online shopper can go to the store to get the ordered items, or the ordered items may be shipped to that online shopper. The order from the online shopper can be placed directly with a particular store, or the order may be sent to that store from an order management system.

At the store, a store clerk may collect the ordered items and prepare these items for shipment to, or pick up by, the online shopper. Usually, the store is able to fill the order from its current inventory. If not all the items are available in the store's current inventory, the store can obtain the missing items from its suppliers or from other stores.

Embodiments of the invention provide a method, system and computer program product for using shoppers for in venue pick up of online orders With reference to FIG. 1, in an embodiment of the invention, a first shopper 102 places an order, represented at 104, with a store 106. The order may be placed in any suitable way such as by using a communications device such as a smart phone. Other communications or computing devices such as laptop computers, desktop computers, and tablets may also be used to place the order. The order may be placed via the Internet, via a cellular telephone network, or via a combination of the Internet and a cellular telephone network. The order may be placed directly with store 106, via the store's own web site. Alternatively, the order may be placed with another organization or enterprise, such as a distributed order management system, and sent to store by that other organization or enterprise.

After store 106 receives the order 104, the store identifies a second shopper 110 in or near the store who may be available to collect the items in the online order. The store sends a notification or request, represented at 112, to this second shopper asking the shopper if he or she would be willing to collect those items, represented at 114, and this request includes a promotional offer, coupon or discount as an incentive for the shopper to collect those items. The message to the second shopper may also be sent in any suitable way, and for example, the message may be sent to a mobile communications device 116 of this shopper. The message may be sent via the Internet, via a cellular communications network, or via a combination of the Internet and a cellular communications network. As will be understood, the message to second shopper 110 can be sent to other devices such as a tablet computer or a laptop computer.

After second shopper 110 retrieves the items 114 in the online order, those items are put into a specific location 120. When the second shopper has completed the task, this shopper is entitled to the reward or incentive offered for the job. When the ordered items are collected in location 120, the first customer 102 can come to the store to pick up the order, as represented at 122, or the order can be shipped to the customer, as represented at 124.

Figure 2:
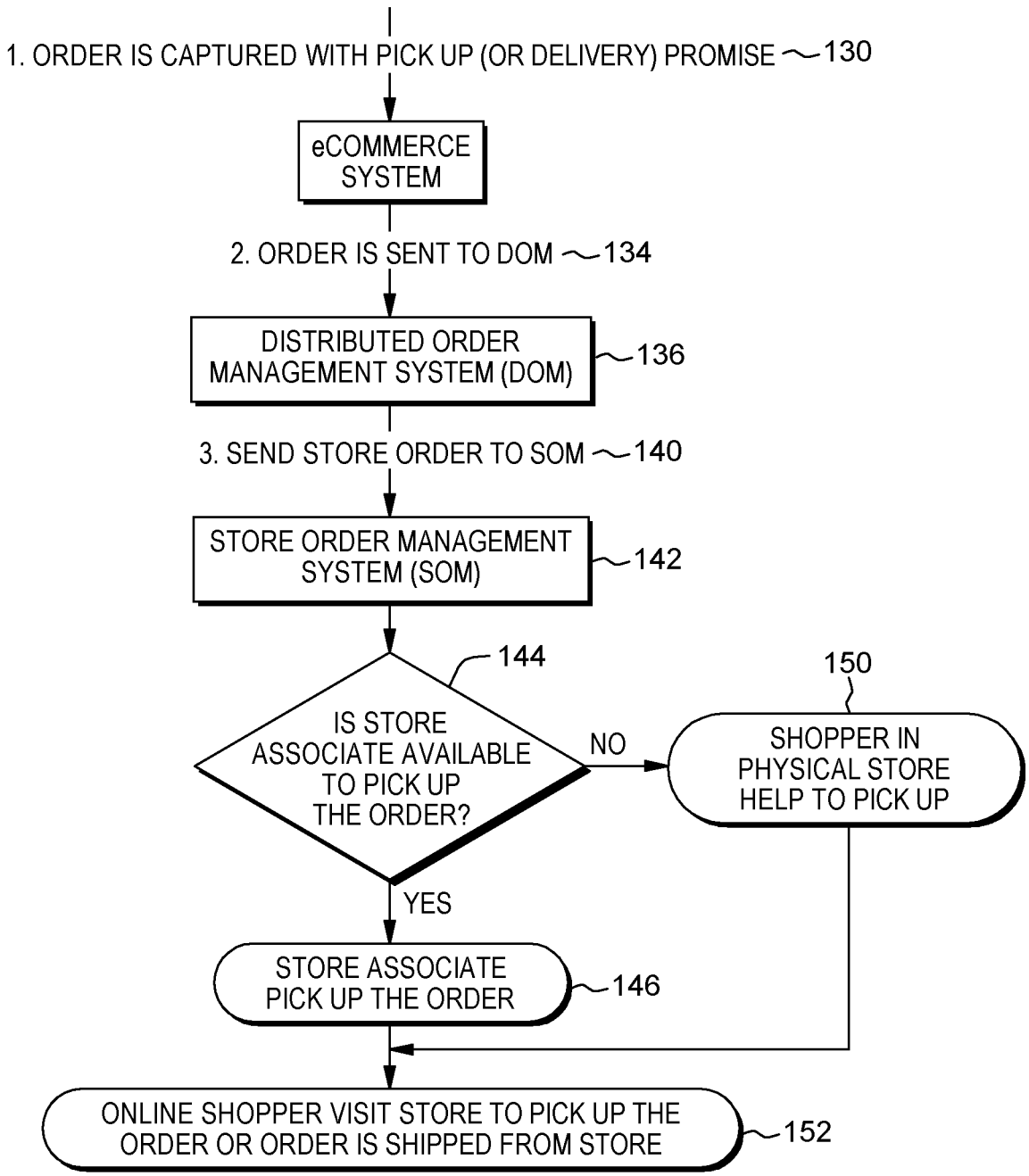
FIG. 2 shows a buy online, pick up in store flow according to an embodiment of the invention.

FIG. 2 illustrates a more detailed example of a method according to an embodiment of this invention. In this method, at 130, an online order is captured from shopper 102. This order may be placed on-line over the Internet at a web site of the store 106. The store may indicate that the ordered goods or items will be available at the store for pick up by the shopper, or that the order will be delivered to the shopper. The store gives a time at which the order will be delivered to the shopper, or at which the order will be available at the store for the shopper.

At 134, the order is sent to a distributed order management (DOM) system 136. The DOM system decides which particular store to send the order to, and at 140, the DOM sends the order to a store order management (SOM) 142 of that store. The SOM for that store determines, at 144, whether a store associate is available to get the items of the order. If a store associate is available, then, at 146, the associate obtains the items and makes the items available for the shopper 102.

If, at 144, no store associate is available to get the items of the order, the method proceeds to 150, and an in-store shopper 110 is used to get those items and to make the items available for the online shopper 102. From both 146 and 150, the method proceeds to 152. The online shopper can visit the store to pick up the order, or the order can be shipped from the store to the online shopper.

Figure 3:
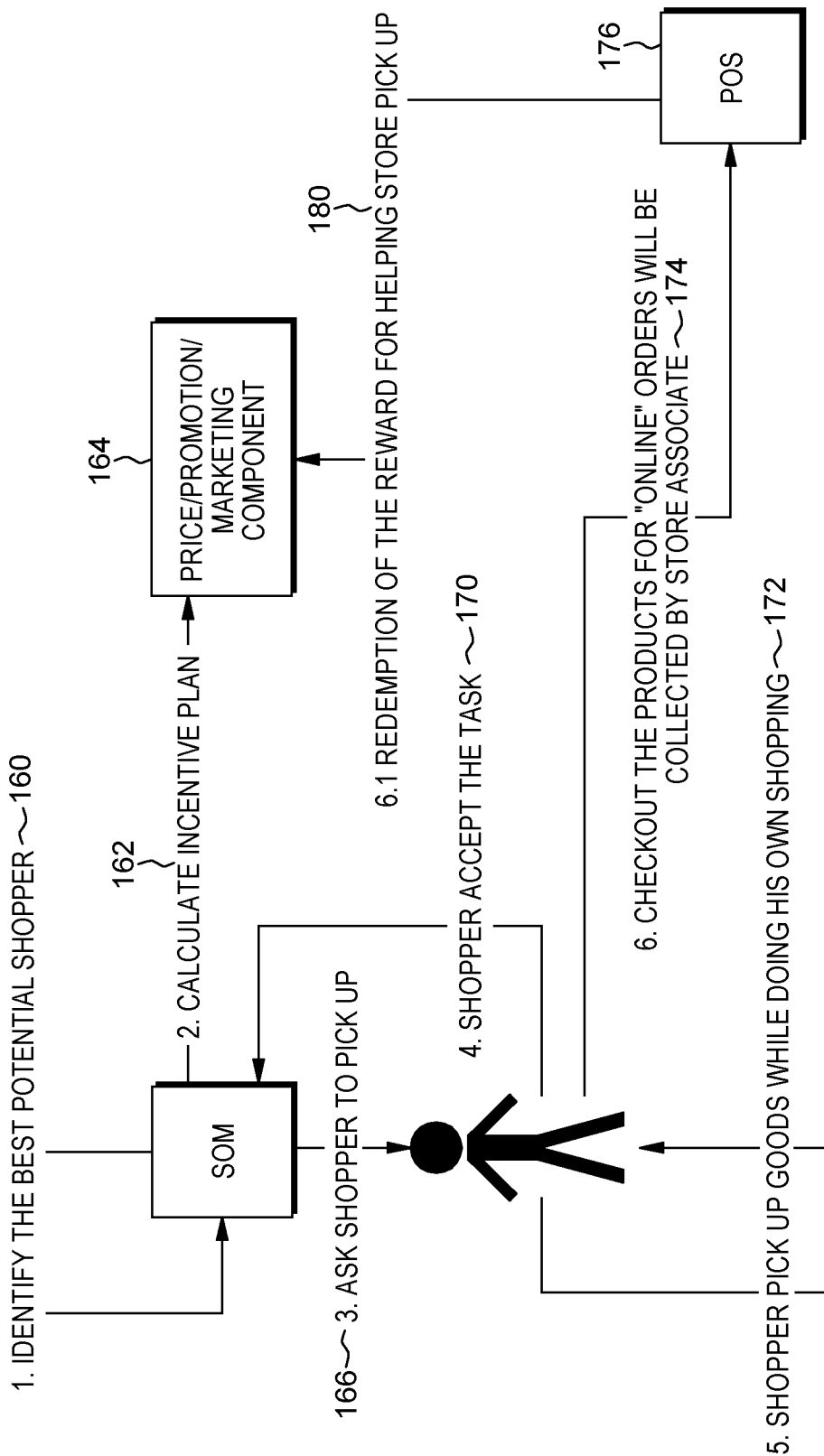
FIG. 3 shows in more detail the way an in store shopper is used, in an embodiment of the invention, in the buy online, pick up in-store flow of FIG. 2.

FIG. 3 shows in more detail a routine that may be used at 150 to leverage an in-store shopper to get the items for the online order. In this routine, at 160, the SOM identifies a best potential shopper for collecting the items for the online shopper. Any suitable procedure may be used to identify this potential shopper.

At 162, an incentive plan 164 is prepared for the potential shopper. This plan may involve a combination of coupons, discounts, promotions and other incentives. The incentive plan could be for current or future shopping based on insight from precision marketing.

The value or content for the promotion/offer may be determined in a variety of ways. In embodiments of the invention, the value of the promotional offer may be based on factors relating to the online shopper. The system may check the online customer value whose order will be picked up later at the store. The system may check whether that customer is a key customer and has a high value to the seller. Some merchants maintain data on the value of customers, including a customer lifetime value (CLV), and these data may be used to determine the value or content for the promotion/offer. Also, the possibility that the store associate will miss a SLA for the online order to be picked up may be taken into account.

In embodiments of the invention, the system may check the number of potential customer available for in-store pick up, and the history of success of incentive values and rewards that were given, and the system may do a calculation as to how different options work, e.g., shopper A may need to be offered a coupon worth two dollars, and shopper B may need to be offered a coupon of four dollars to retrieve product A. The system may also calculate possible value based on customer behavior history and the dwelling pattern of the customer in the store.

The system can analyze a wishlist of the potential in-store picker from eCommerce data, and generate a relevant coupon. The potential selling to the in-store picker may generate enough profit to cover the cost of the reward for picking up the goods for the online order.

Other approaches may also be considered. For example, an approach may be based on a cost/effort analysis. This may include a calculation of how long it may take to pick up the goods, e.g., to pick up an order with five goods in different locations may take twenty minutes, verses picking up one item in one location may take four minutes. The promotion and offer could be different for these different orders. The cost of having a store associate pick up the goods, given the wage and salary of the store associate, could be a reference to the cost/budget for the reward.

At 166, the in-store shopper 110 is asked to pick up the items of the on-line order. For example, this request can be made via a mobile communications device such as a smart phone 116. The in-store shopper can choose whether to accept or reject the task, and at 170, the shopper notifies the SOM of that decision.

If the shopper accepts the task, the shopper, at 172, picks up the items of the online order, and this may be done while the in-store shopper is doing his or her own shopping. The SOM can send detailed location information or product images to the shopper to help with the pick up of those goods. If the shopper is unable to complete the job, the shopper can notify the SOM system that he or she cannot finish the task. In embodiments of the invention, the SOM has a timer for each task. If the in-store shopper rejects the task or if the allocated time elapses, the SOM identifies and notifies another in-store shopper to pick up the order.

As, or after, the in-store shopper picks up the items in the online order, the in-store shopper, at 174, takes those goods to a person or location in the store. For instance, a store associate in a point-of-sale (POS) lane 176 may collect the goods. As another option, the in-store shopper can take the goods to a designated location in the store. After the goods are delivered to the appropriate person or location, the in-store shopper, at 180, is given the determined incentive.

In an embodiment of the invention, a locker inside the physical store can allow the end-to-end scenarios to be done without any store associate effort. In this embodiment, a shopper (shopper A) is selected for order preparation, and this shopper picks up the items and takes them to a locker. Shopper A scans a bar code that shopper A got earlier for the order. The goods are scanned before they are put into the locker. When all the items for the order are assembled, scanned and put in the locker, shopper A has done his or her job and shopper A gets the incentive.

The online shopper (shopper B) visits the store for order pick up, by scanning the bar code. Shopper B takes the order from the locker with self serve service. If there is anything wrong with the order, the shopper B can talk to a store associate to correct the order.

Figure 4:
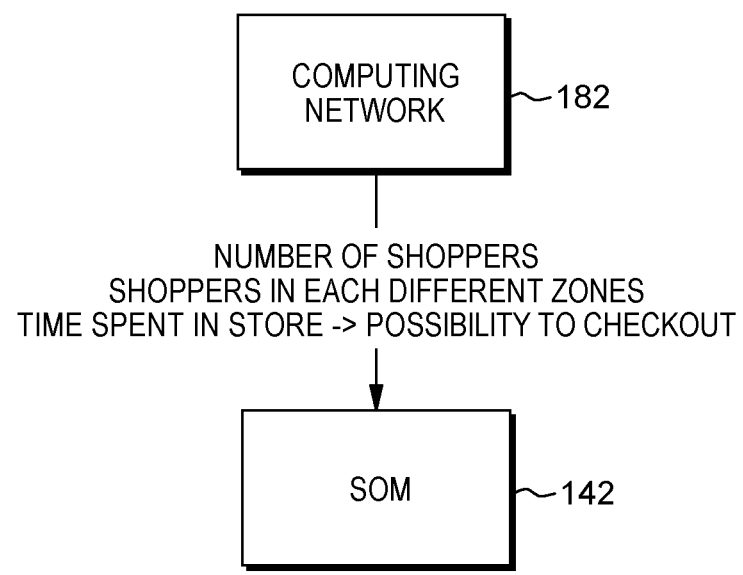
FIG. 4 illustrates a procedure that may be used in embodiments of the invention to determine the best potential shopper to do the in-store pick up.

FIG. 4 shows how the SOM 142 can leverage a computer network, represented at 182, to determine who is the best potential shopper or person to do the task. The computing network includes sensors, and collects and then analyzes location data to identify patterns and actionable events, such as sending notifications, offers, etc., for in store pick up. This computing network includes information about the shoppers in the store, or other people in the store, including the number of shoppers and other people, where they are in the store, and additional data about these shoppers and people. Based on this information—including the number of shoppers in the store, the number of shoppers in each of different zones of the store, the time each shopper has spent in the store, and other data—the SOM identifies a best potential shopper. For example, this shopper may be a person who is primarily, or only, accompanying another shopper in the store. The computing network may detect that the person is idle within the store and may send a notification for pick up request.

The system to identify who is the best candidate for in-store pick up may take into consideration the location of the second, in-store shopper, who is near the products to be picked up, the dwelling time of the second shopper in the store, whether the second shopper has been in the store for a long time or has just entered the store. If the online order needs to be ready soon, it may not be best to select a shopper who has just entered the store. In-store shoppers may be given scores, and the shopper with the highest score may be selected for the in-store pick up. Shopper behavior history may also be taken into consideration. If a particular shopper has done a great job historically, that shopper may get a high score, or very favorable consideration, for selection for the next job.

To select a customer for in-store pick up, computing network 182 (in an indoor location detection solution) can detect who (which customer) is in the physical store, and in which location. The computing network can further detect how long the customer has been in the store. If a shopper has been in the store a very long time, the customer may leave the store soon, and the shopper might not be a good candidate for an in-store pick up request. If the shipper has been in the store for a short time, and normally the shopper spends more time in the store, the shopper gets a higher score. If the customer is rushing to the store, is moving very fast, or is on the way to a checkout counter, the shopper gets a low score.

In embodiments of the invention, the computing network can know or determine what a customer has purchased before, or based on an analysis of the customer's online behavior, the computing network may be able to understand whether the customer is good for some particular domain or domains. If the customer is good for a particular domain that is relevant to the products to be picked up, the shopper gets a higher score.

In embodiments of the invention, a shopper may have an appointment to come to the store to pick up or return some goods. The computing network can know when the shopper will arrive, and, even though the shipper is not in the physical store, this shopper can be counted as a candidate for in-store pick up of goods for an online order.

Also, if some customer has previously done a great job helping to pick up goods for the seller, the system will learn that this shopper is a good resource, and that shopper gets a higher score.

In embodiments of the invention, based on all the above, the system can do a calculation to get a score for shoppers who might help.

Figure 5:
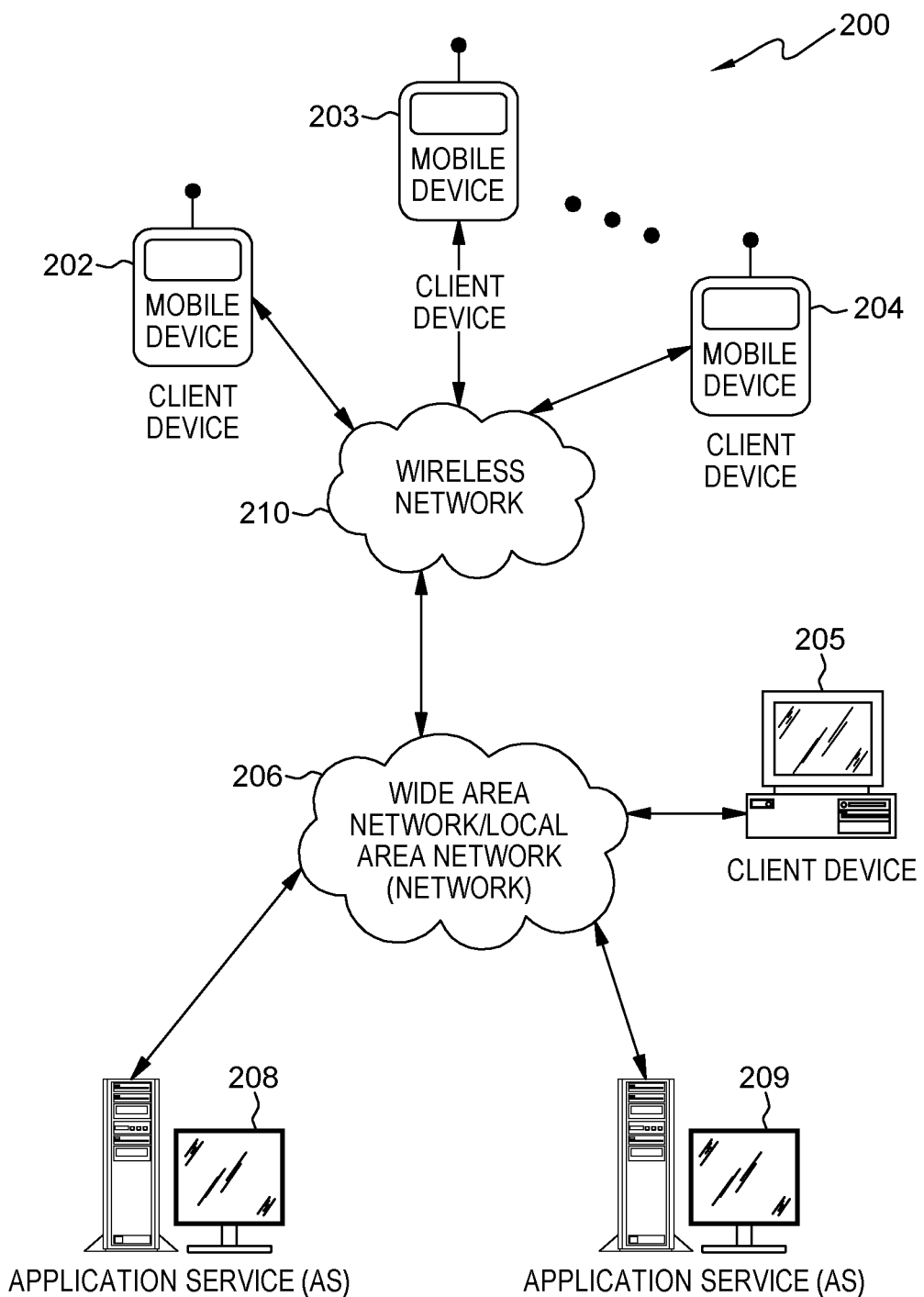
FIG. 5 shows a computer network environment that may be used in embodiments of the invention.

FIG. 5 shows components of an exemplary computer network environment 200 that may be used in embodiments of the invention. Not all the illustrated components may be required to practice the invention, and variations in the arrangement and type of the components may be made without departing from the spirit or scope of the invention. As shown, system 200 of FIG. 5 includes local area networks ("LANs")/wide area network 206, wireless network 210, mobile devices 202-204, client device 205, and application services (AS) 208-209.

Generally, mobile devices 202-204 may include virtually any portable computing device that is capable of receiving and sending a message over a network, such as networks 206 and wireless network 210. Such devices include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 202-204 typically range widely in terms of capabilities and features.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 202-204 may each receive messages sent from AS 208-209, from one of the other mobile devices 202-204, or even from another computing device. Mobile devices 202-204 may also send messages to one of AS 208-209, to other mobile devices, or to client device 205, or the like. Mobile devices 202-204 may also communicate with non-mobile client devices, such as client device 205, or the like.

Wireless network 210 is configured to couple mobile devices 202-204 and its components with network 206. Wireless network 210 may include any of a variety of wireless sub-networks that may further overlay stand-alone ad-hoc networks, and the like, to provide an infrastructure-oriented connection for mobile devices 202-204. Such sub-networks may include mesh networks, Wireless LAN (WLAN) networks, cellular networks, and the like.

Network 206 is enabled to employ any form of computer readable media for communicating information from one electronic device to another. Also, network 206 can include the Internet in addition to local area networks (LANs), wide area networks (WANs), direct connections, such as through a universal serial bus (USB) port, other forms of computer-readable media, or any combination thereof.

AS 208-209 include virtually any device that may be configured to provide an application service. Such application services or simply applications include, but are not limited to, email applications, search applications, video applications, audio applications, graphic applications, social networking applications, text message applications, or the like. In one embodiment, AS 208-209 may operate as a web server. However, AS 208-209 are not limited to web servers.

Those of ordinary skill in the art will appreciate that the architecture and hardware depicted in FIG. 5 may vary.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of using shoppers to collect and deliver products for in-venue pick up of online orders when no employee of the venue is available to collect the products, the method comprising:
    determining, at an order management system, that an online order has been placed by a first shopper for a product in a venue;
    triggering use of an in-store shopper to get the product of the order based on a determined availability of an associate of the venue to get the product, including
        the order management system determining whether an associate of the venue is available to get the product of the order, and
        when no associate of the venue is determined as available to get the product of the order, the order management system identifying a second shopper in the venue based on defined criteria to get the product in the venue and preparing an incentive plan for the second shopper, including determining that the second shopper is within a threshold distance to the product in the venue, said second shopper being a shopper of the venue, wherein the second shopper is not affiliated with the venue nor employed by the venue;
    the order management system sending to the second shopper a message including a request that the second shopper get the product in the venue and deliver the product to a specified location in the venue, and a promotional offer to the second shopper in exchange for getting the product in the venue, and wherein the order management system is notified of a decision by the second shopper to accept or reject the request;
    if the second shopper accepts the request, receiving the obtained product from the second shopper at a specified location in the venue or by a designated person in the venue;
    and
    in response to receiving the obtained product from the second shopper, honoring, by the order management system, the promotional offer to the second shopper, wherein the product received from the second shopper is collected at the venue.

2. The method according to claim 1, wherein the identifying a second shopper includes identifying the second shopper in a specified area relative to the venue.

3. The method according to claim 1, further comprising:
    determining a cost to the venue associated with getting the product in the store; and
    generating the promotional offer based, at least in part, on the determined cost to the venue associated with getting the product in the store.

4. The method according to claim 3, wherein the determining a cost to the venue associated with getting the product in the store includes determining a cost of having a defined associate of the venue get the product in the store.

5. The method according to claim 4, further comprising modifying the promotional offer under specified conditions.

6. The method according to claim 5, wherein:
    the promotional offer has a determined value; and
    the modifying the promotional offer includes increasing the value of the promotional offer.

7. The method according to claim 6, wherein the increasing the value of the promotional offer includes keeping the value of the promotional offer at or below the determined cost of having a defined associate of the venue get the product in the store.

8. The method according to claim 1, further comprising:
    determining a cost to the venue associated with getting the product in the store;
    assigning a value to the promotional offer; and
    responsive to a determination that the promotional offer has not resulted in the second shopper getting the product, increasing the value of the promotional offer such that the value corresponds to an equivalent of, at most, the cost to the venue of getting the product in the store.

9. The method according to claim 1, wherein the sending to the second shopper a message including a promotional offer includes calculating a value of the promotional offer based on customer behavior history of the second shopper and a dwelling pattern of the second shopper in the venue.

10. The method according to claim 1, wherein the identifying a second shopper includes using specified information to identify the second shopper, the specified information including the number of shoppers in the venue, the number of said shoppers in each of different zones of the venue, the time each of said shoppers has spent in the venue, the time each of the shoppers has been in the venue compared to an amount of time the each shopper normally spends in the venue, a speed of the shopper in the venue, and a location to which the shopper is going to in the venue.

11. The method according to claim 1, further comprising:
assigning a value to the promotional offer, including
maintaining data on a value of the first shopper, and
using the data on the value of the first shopper to determine the value of the promotional offer to the second shopper.

12. The method according to claim 1, wherein:
the identifying a second shopper in the venue includes detecting that a person is idle within the venue; and
the sending to the second shopper a message including a promotional offer includes
sending the message to the idle person,
analyzing a list of the second shopper from e-commerce data, and
generating a coupon relevant to the list.

13. A system for identifying and incentivizing shoppers to collect and deliver products for in-venue pick up of online orders when no employee of the venue is available to collect the products, the system comprising:
one or more processor units;
memory operatively connected to the one or more processing units and storing computer program instructions, and wherein said instructions, when executed by the one or more processing units, configure the one or more processor units for:
determining, at an order management system, that an online order has been placed by a first shopper for a product in a venue;
triggering use of an in-store shopper to get the product of the order based on a determined availability of an associate of the venue to get the product, including
the order management system determining whether an associate of the venue is available to get the product of the order, and
when no associate of the venue is determined as available to get the product of the order, the order management system identifying a second shopper in the venue based on defined criteria to get the product in the venue and preparing an incentive plan for the second shopper, including determining that the second shopper is within a threshold distance to the product in the venue, said second shopper being a shopper of the venue, wherein the second shopper is not affiliated with the venue nor employed by the venue;
the order management system sending to the second shopper a message including a request that the second shopper get the product in the venue and deliver the product to a specified location in the venue, and a promotional offer to the second shopper in exchange for getting the product in the venue, and wherein the order management system is notified of a decision by the second shopper to accept or reject the request, wherein if the second shopper accepts the request, the product obtained by the second shopper is received at a specified location in the venue or by a designated person in the venue; and
in response to receiving the obtained product from the second shopper, honoring, by the order management system, the promotional offer to the second shopper, wherein the product received from the second shopper is collected at the venue.

14. The system according to claim 13, wherein the sending to the second shopper a message including a promotional offer includes:
determining a cost to the venue associated with getting the product in the store; and
generating the promotional offer based, at least in part, on the determined cost to the venue associated with getting the product in the store.

15. The system according to claim 14, wherein:
the promotional offer has a determined value; and
the sending to the second shopper a message including a promotional offer includes increasing the value of the promotional offer under specified conditions.

16. The system according to claim 15, wherein the increasing the value of the promotional offer includes keeping the value of the promotional offer at or below a determined cost of having a defined associate of the venue get the product in the store.

17. The system according to claim 13, wherein:
the venue is a given store;
the identifying a second shopper includes identifying a shopper in the given store to get the product, and giving the second shopper a defined amount of time to get the product in the venue.

18. A computer program product for identifying and incentivizing shoppers to collect and deliver products for in-venue pick up of online orders when no employee of the venue is available to collect the products, the computer program product comprising:
a computer readable storage medium having program instructions embodied therein, the program instructions executable by a computer to cause the computer to perform the method comprising:
determining, at an order management system, that an online order has been placed by a first shopper for a product in a venue;
triggering use of an in-store shopper to get the product of the order based on a determined availability of an associate of the venue to get the product, including
the order management system determining whether an associate of the venue is available to get the product of the order, and
when no associate of the venue is determined as available to get the product of the order, the order management system identifying a second shopper in the venue based on defined criteria to get the product in the venue and preparing an incentive plan for the second shopper, including determining that the second shopper is within a threshold distance to the product in the venue, said second shopper being a shopper of the venue, wherein the second shopper is not affiliated with the venue nor employed by the venue;
the order management system sending to the second shopper a message including a request that the second shopper get the product in the venue and deliver the product to a specified location in the venue, and a promotional offer to the second shopper in exchange for getting the product in the venue, and wherein the order management system is notified of a decision by the second shopper to accept or reject the request, wherein of the second shopper accepts the request, the product obtained by the second shopper is received at a specified location in the venue or by a designated person the venue; and in response to receiving the obtained product from the second shopper, honoring, by the order management system, the promotional offer to the second shopper, wherein the product received from the second shopper is collected at the venue.

19. The computer program product according to claim 18, wherein the identifying a second shopper includes identifying the second shopper in a specified area relative to the venue.

20. The computer program product according to claim 18, the method further comprising:

determining a cost to the venue associated with getting the product in the store; and generating the promotional offer based, at least in part, on the determined cost to the venue associated with getting the product in the store.

* * * * *